No. 729,321.

Patented May 26, 1903.

UNITED STATES PATENT OFFICE.

OSKAR FRANCKE, OF MÜHLHAUSEN, GERMANY, ASSIGNOR TO MARTIN HEBERLEIN, OF EISENACH, GERMANY.

PROCESS OF PREPARING FUEL COMPOSITION.

SPECIFICATION forming part of Letters Patent No. 729,321, dated May 26, 1903.

Application filed October 31, 1901. Serial No. 80,707. (No specimens.)

*To all whom it may concern:*

Be it known that I, OSKAR FRANCKE, manufacturer, a subject of the King of Prussia, German Emperor, residing at Mühlhausen i. Th., in the Kingdom of Prussia, German Empire, have invented certain new and useful Improvements in Processes of Preparing Fuel Compositions, of which the following is a specification.

The present invention relates to a method of increasing the heating power of combustibles in general.

The improved method consists, mainly, in adding to the combustibles other substances in a finely-divided condition forming nitroglycerin-like compounds, from which on combustion taking place gases of intense heating power are developed.

The invention consists, further, in adding substances which when burned at an intense heat produce Dowson-like gases. Owing to this treatment the combustibles may be easily ignited and produce on burning an intense and lasting heat. The method, therefore, is especially adapted for enriching combustibles of inferior value, such as poor brown coal, peat, waste peat, leaves, sawdust, coal-slime, peat-slime, and poor coal and fuel in general, such fuel being generally very difficult to ignite and developing but small heating power on being burned. By the above treatment the combustibles are enriched, so as to become easily inflammable and to give a considerably-increased heating power. The method, however, is also applicable to fuel of comparatively high heating power—such as mineral coal, good brown coal, or the like—as the heating power and the inflammability of such fuel also are considerably increased by the above treatment.

The method is based on covering or impregnating the fuel (which preferably is treated after having been suitably reduced) with a layer of such matters, which form a nitroglycerin-like compound spread in a finely-divided state over the fuel. By this means the inflammability of the fuel is considerably increased, superheated steam in a finely-divided condition is produced in the fuel, the combustion taking place, so that the fuel, which under the influence of the heat produced from the nitroglycerin-like compounds, glows and produces a Dowson-like gas, which burns as it is produced by the heat of the burning gases of the nitroglycerin-like compounds. In order to provide the fuel with such a water-containing nitroglycerin-like coating, the following method is employed:

The combustible—for instance, coal, coal-dust, peat-rubble, leaves, sawdust, coal-mud, or peat-mud—with a total weight of, say, twenty-five kilograms is first intimately mixed in a suitably-reduced state with twenty-five kilograms of a suitable calcium salt, such as calcium sulfate, and also with a little ash, then mixed with a dilute solution—one hundred grams of nitric acid—so that the same is uniformally distributed over all the mixed substances. Raw glycerin—say one hundred grams—strongly diluted with water is then to be added and the whole again very well mixed. The nitric acid uniformly distributed throughout the added water, owing to this mixing, forms with the raw glycerin, likewise very finely distributed in the water, a nitroglycerin-like compound. The compound is not a pure nitroglycerin, as for the formation of the latter sulfuric acid is required. The mixture of fuel and ingredients is finally slightly compressed and dried in the air, whereupon it is ready for use. The abundant supply of water causes the nitric acid in the glycerin to be finely distributed throughout the whole mass, water being also contained in the form of very fine particles in the interior of the artificial fuel produced as above. The sulfate of lime binds or incloses the coal-component parts and the nitroglycerin-like compounds and serves in its glowing condition as a conductor of heat. The gases developed from these compounds then produce an intense local combustion. By this means the coal particles contained in the interior of the fuel are coked and the inclosed water particles are changed into steam and superheated. They combine with the glowing coked coal to form a Dowson-like gas, which produces an energetic combustion and also enables a very high temperature to be obtained. The gases produced from the nitroglycerin-like compound and the Dowson gas, produced by the coking of the coal and the presence of the water, produce on burning a considerable heat, and consequently increase the heating power of the fuel. In this way on combustion taking place nitroglycerin-like, but not pure nitroglycerin, compounds are obtained. The development of gases from such nitroglycerin-like compounds, as well as the development of the Dowson gas, takes place only in the heated portion of the fuel. These gases burn *in statu nascendi* and in this way give up their heating energy. Hydrocarbons such as resins, oils, petrol, waste naphtha may be added to the carbon, if desired, without departing from the spirit of the invention.

From the foregoing description it will be seen that the present invention is especially adapted for enriching poor fuel—such as peat, peat waste, sawdust, leaves, &c. When using peat as fuel, the new method has the advantage that the peat need not be dried, as according to the invention water is added to the fuel, which in carrying out the process is bound and becomes free only on combustion taking place.

Artificial fuel obtained by the method according to the present invention is readily inflammable and produces considerable heat on burning. It might be added to other combustibles of inferior value—for instance, to poor brown coal (the whole mixture being used instead of good mineral coal)—in order to obtain an energetic combustion; also, good coal may be enriched as regards heating power and inflammability by means of the described process, such a coal giving a considerably-increased heating power per unit of volume. This may be of special importance in cases when an intense production of heat is intended to take place in a limited space or when the room for storing fuel is very restricted—as, for instance, in vessels, engines, or the like. The increase of heating power of the fuel is also of great importance in metallurgy and in the metal industries.

Coal treated according to the method described burns with a white luminous flame, almost without production of smoke, and very uniformly. The ashes are white and owing to the intense development of gases break up easily, so that they can be removed readily from the grate. The ashes continue in a white glowing condition until the gases produced from the glycerin compound and the coal and the Dowson-like gases are totally consumed.

Fuel treated according to the method described may be, if desired, formed into briquets, cubes, or the like and then dried.

I claim—

1. The method described, consisting in mixing intimately a reduced combustible with calcium sulfate, then applying dilute nitric acid and dilute glycerin so as to inclose or coat the combustible with nitroglycerin-like substance and water, and finally forming the fuel into desired shapes and drying the same, substantially as described.

2. The method described, consisting in mixing intimately a reduced combustible with calcium sulfate, then applying dilute nitric acid and dilute glycerin so as to inclose or coat the combustible with a nitroglycerin-like substance and water, and adding liquid hydrocarbon, such as residues of resin, substantially as described.

In testimony whereof I have hereunto set my hand in presence of two subscribing witnesses.

OSKAR FRANCKE.

Witnesses:
 WILHELM BINDEWALD,
 MAX MEYER.